(12) United States Patent
Sakurets et al.

(10) Patent No.: US 10,846,769 B2
(45) Date of Patent: Nov. 24, 2020

(54) METHOD FOR CONFIGURING AND CONDUCTING SERVICE EXCHANGES OVER NETWORK WITHOUT MONETARY TRANSACTIONS

(71) Applicant: Swap Your Time, LLC, Minneapolis, MN (US)

(72) Inventors: Pavel Sakurets, Maple Grove, MN (US); Konstantin Zuyev, Plymouth, MN (US)

(73) Assignee: Swap Your Time LLC, Minneapolis, MN (US)

( * ) Notice: Subject to any disclaimer, the term of this patent is extended or adjusted under 35 U.S.C. 154(b) by 887 days.

(21) Appl. No.: 15/214,830

(22) Filed: Jul. 20, 2016

(65) Prior Publication Data

US 2018/0025416 A1    Jan. 25, 2018

(51) Int. Cl.
*G06Q 30/00*    (2012.01)
*G06Q 30/06*    (2012.01)

(52) U.S. Cl.
CPC ..... *G06Q 30/0613* (2013.01); *G06Q 30/0619* (2013.01)

(58) Field of Classification Search
CPC ............... G06Q 30/00; G06Q 30/0601; G06Q 30/0613; G06Q 30/0619
See application file for complete search history.

(56) References Cited

U.S. PATENT DOCUMENTS

| | | | | |
|---|---|---|---|---|
| 7,437,323 | B1* | 10/2008 | Valkov | G06Q 40/04 705/36 R |
| 7,877,315 | B2 | 1/2011 | Pickering | |
| 2001/0042041 | A1 | 11/2001 | Moshal et al. | |
| 2001/0056396 | A1 | 12/2001 | Goino | |
| 2006/0064409 | A1 | 3/2006 | Hardwick | |
| 2006/0106675 | A1* | 5/2006 | Cohen | G06Q 30/0601 705/26.1 |
| 2008/0046336 | A1 | 2/2008 | Mosleh | |
| 2010/0174587 | A1* | 7/2010 | Seidman | G06Q 10/063 705/7.14 |
| 2010/0235288 | A1 | 9/2010 | Kisbye | |
| 2011/0099037 | A1* | 4/2011 | Levin | G06Q 10/02 705/5 |
| 2011/0313820 | A1* | 12/2011 | Biewald | G06Q 10/06311 705/7.42 |
| 2012/0179549 | A1* | 7/2012 | Sigmund | G06Q 30/0261 705/14.58 |
| 2012/0284143 | A1* | 11/2012 | Hunter | G06Q 30/0601 705/26.4 |
| 2013/0246255 | A1* | 9/2013 | Pernice | G06Q 20/085 705/39 |
| 2013/0246301 | A1* | 9/2013 | Radhakrishnan | G06Q 30/0282 705/347 |
| 2015/0038129 | A1* | 2/2015 | Sundareswaran | H04W 24/02 455/418 |

OTHER PUBLICATIONS

Gebauer, Heiko, et al. "Match or mismatch: Strategy-structure configurations in the service business of manufacturing companies." Journal of Service Research 13.2 (2010): 198-215. (Year: 2010).*

* cited by examiner

*Primary Examiner* — Christopher B Seibert
(74) *Attorney, Agent, or Firm* — Dmitry Zuev, Esq.

(57) ABSTRACT

A method for conducting a plurality of electronic service exchanges over a network and a tangible, non-transient computer readable medium including instructions stored thereon to carry out the method are disclosed. The exchanges are conducted between two or more service providers on a basis of service time and description, and do not involve any monetary transaction. The method includes receiving information about an offered and requested service to initiate service exchanges. A plurality of parameters associated with the offered and requested services and an instruction set for each exchange are then identified. When the identification results in a match between the offered service and the requested service of a first service provider on a first terminal coupled to the network and the requested service and the offered service of at least one additional service provider on at least one additional terminal coupled to the network, the service exchange is conducted.

19 Claims, No Drawings

METHOD FOR CONFIGURING AND CONDUCTING SERVICE EXCHANGES OVER NETWORK WITHOUT MONETARY TRANSACTIONS

BACKGROUND

1. Field

Embodiments of the present invention are related to a method for configuring and conducting service exchanges over the computer network which do not involve any monetary transactions, and a tangible, non-transient computer readable medium including instructions stored thereon to carry out the method.

2. Description of Related Arts

Electronic marketplaces are widely used in a modern society. A typical example of the electronic marketplace is an online store or an auction through which a user can offer, buy, or sell goods and services. Not every transaction, however, brings satisfaction to an online store customer or online auction participant. Every now and then, the buyer discovers that the shipped goods are not worthy of purchasing. Sometimes, the price is so high that the buyer cannot afford it. In addition, all of the electronic marketplaces necessarily involve monetary transactions, which require creating payment accounts and providing sensitive financial information, such as bank or credit card account numbers. The online money transfers often result in security breaches and identity theft. While some online stores provide an opportunity for barter transactions of goods, no electronic marketplaces currently offer service exchanges that do not include money.

SUMMARY OF THE INVENTION

The present invention solves the above issues experienced by the online shoppers and the online auction participants.

Provided is a method for conducting a plurality of electronic service exchanges over a network, wherein each exchange is conducted between two or more service providers of a set of service providers, wherein the set of service providers includes a first service provider on a first terminal coupled to the network and at least one additional service provider on at least one additional terminal coupled to the network, wherein each service exchange is conducted on a basis of service description and service time and does not involve any monetary transaction, and wherein the method includes:

receiving information about an offered service and a requested service from each service provider of the set of service providers, wherein the information is provided to initiate one of the plurality of service exchanges;

identifying a plurality of parameters associated with the offered service and the requested service of each service provider;

identifying an instruction set for each exchange based on the plurality of parameters associated with the offered service and the requested service of each service provider;

identifying a match of the offered service and the requested service of the first service provider with the requested service and the offered service of the at least one additional service provider; and conducting the service exchange between the first service provider and the at least one additional service provider.

Also provided is a tangible, non-transient computer readable medium including instructions stored thereon to carry out the method for conducting a plurality of electronic service exchanges.

DETAILED DESCRIPTION OF THE INVENTION

Reference will now be made in detail to the embodiments. In this regard, the present embodiments may have different forms and should not be construed as being limited to the descriptions set forth herein. Accordingly, the embodiments are merely described below to explain aspects of the present description.

As used herein, the term "and/or" includes any and all combinations of one or more of the associated listed items.

The terminology used herein is for the purpose of describing particular embodiments only and is not intended to be limiting. As used herein, the singular forms "a," "an" and "the" are intended to include the plural forms as well, unless the context clearly indicates otherwise. The term "or" means "and/or." It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical terms) used herein have the same meaning as commonly understood by one of ordinary skill in the art to which this general inventive concept belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

The present invention provides a method for configuring and conducting service exchanges over the computer network which do not involve any monetary transactions between service providers.

In an embodiment, a method for conducting a plurality of electronic service exchanges over a network is disclosed. Each exchange can be conducted between two or more service providers of a set of service providers. A service provider can be any individual who is legally competent to enter in a commercial transaction with another service provider. A service provider can also be a business entity, such as a partnership or a corporation. The service exchange can be simultaneous, in which all of the transactions take place at the same time or within the same time period. Alternatively, the service exchange can involve several consecutive transactions that occur at different times. The set of service providers can be unlimited and may ultimately include as many providers as the computer network can accommodate. In an embodiment, the set of service providers may include a first service provider on a first terminal coupled to the network and at least one additional service provider on at least one additional terminal coupled to the network. As used herein, the term "terminal" refers to a computer unit, which can be either personal or shared.

Each service exchange is conducted on a basis of a service description. The service can be any service, which does not violate the laws of a jurisdiction in which the service is offered or rendered. Each service exchange can further be conducted on a basis of service time. No service exchange may involve a monetary transaction.

In an embodiment, the method for configuring and conducting service exchanges over the computer network may include:

receiving information about an offered service and a requested service from each service provider of the set of service providers, wherein the information is provided to initiate one of the plurality of service exchanges;

identifying a plurality of parameters associated with the offered service and the requested service of each service provider;

identifying an instruction set for each exchange based on the plurality of parameters associated with the offered service and the requested service of each service provider;

identifying a match of the offered service and the requested service of the first service provider with the requested service and the offered service of the at least one additional service provider; and conducting the service exchange between the first service provider and the at least one additional service provider.

The at least one additional service provider may be a second service provider on a second terminal coupled to the network. In this embodiment, the identification of an instruction set for each exchange based on the plurality of parameters associated with the offered service and the requested service of each service provider may be followed by:

identifying a match between the offered service and the requested service of the first service provider and the requested service and the offered service of the second service provider; and conducting the service exchange between the first service provider and the second service provider.

For example, the first service provider can be a painter, who is in need of cleaning their house, and the second service provider may be a cleaning maid, who would like to get their room painted. Once the match between the offered service of the first service provider and the requested service of the second service provider (painting a room) and the requested service of the first service provider and the offered service of the second service provider (cleaning a house) is identified, the service exchange takes place without any money involved.

The service exchange may further include service time, which can be any time period. In another example, a painter (first service provider) may offer to paint a room of a music teacher (second service provider) in exchange of two 45 minute piano lessons for the painter's child. Once the match between the offered service of the first service provider and the requested service of the second service provider (painting a room) and the requested service of the first service provider and the offered service of the second service provider (two 45 minute piano lessons) is identified, the service exchange takes place without any money involved.

In yet another example, a music teacher (first service provider) may offer a chemistry tutor (second service provider) a 45 minute piano lesson in exchange for a 45 minute tutoring session. Once the match between the offered service of the first service provider and the requested service of the second service provider (a 45 minute piano lesson) and the requested service of the first service provider and the offered service of the second service provider (a 45 minute chemistry tutoring) is identified, the service exchange takes place without any money involved.

In another embodiment, the identification of a match between the requested service of the first service provider and the offered service of the at least one additional service provider may further include:

identifying time increments of the offered service and the requested service of each service provider, and negotiating the service exchange between the first service provider and the at least one additional service provider when a number of time increments of the offered service of the first service provider does not match a number of time increments of the offered service of the at least one additional service provider.

For example, when the matching services of two users are involved, a painter (first service provider) may decide that painting a room of a music teacher (second service provider) is worth three time increments, while the value of two 45-minute piano lessons conducted by the music teacher is only two time increments. Under these circumstances, the parties may engage in negotiations, which can produce three different outcomes. In the first outcome, the music teacher may propose an additional 45-minute piano lesson, thus bringing the value of three piano lessons to match three time increments of the painting job. In the second outcome, the parties may negotiate a "middle ground", wherein the music teacher may offer two 45-minute lessons and one 30-minute lesson in exchange for painting their room. In the third outcome, the painter and the music teacher may eventually agree to exchange the services without making any changes. No money may be involved in the transaction.

Most of the time, the offered service of the first service provider matches the requested service of the second service provider, and the requested service of the first service provider matches the offered service of the first service provider, thus resulting in the exchange between the users. However, there are situations, in which the offered and requested services of the parties do not match, and the presence of at least one additional service provider is required to carry out a service exchange.

Under such circumstances, the set of service providers may further include a third service provider on a third terminal coupled to the network, and the identification of an instruction set for each exchange based on the plurality of parameters associated with the offered service and the requested service of each service provider may be followed by:

identifying a match between the offered service of the first service provider and the requested service of the second service provider, a match between the offered service of the second service provider and the requested service of the third service provider and a match between the offered service of the third service provider and the requested service of the first service provider; and conducting the service exchange between the first service provider, the second service provider, and the third service provider.

For example, a painter (the first service provider), who is in need of two 45-minute piano lessons for their child, may offer to paint a room of a cleaning maid (the second service provider), who may offer to clean the house of a music teacher (the third service provider), who may offer two 45-minute piano lessons for the painter's child. Once the network identifies a set of three service providers with matching offered and requested services within that set, the service exchange takes place with no money involved in the transaction. The identification of service providers having desired offered and requested services inside the set of service providers can be conducted by a computer via a mathematical algorithm or by operators of the service exchange platform.

The at least one additional service provider may further include a fourth service provider on a fourth terminal coupled to the network. In this embodiment, the identification of an instruction set for each exchange based on the plurality of parameters associated with the offered service and the requested service of each service provider may be followed by:

identifying a match between the offered service of the first service provider and the requested service of the second service provider, a match between the offered service of the second service provider and the requested service of the third service provider, a match between the offered service of the third service provider and the requested service of the fourth service provider, and a match between the offered service of the fourth service provider and the requested service of the first service provider; and conducting the service exchange between the first service provider, the second service provider, the third service provider, and the fourth service provider.

For example, a painter (the first service provider), who is in need of repairing the brakes of their van, may offer to paint a room of a cleaning maid (the second service provider), who may offer to clean the house of a music teacher (the third service provider), who may offer a 45-minute piano lessons for the child of the car mechanic (the forth service provider), who may offer to fix the breaks of the painter's van. Once the network identifies a set of four service providers with matching offered and requested services within that set, the service exchange takes place without any money involved. The identification of service providers having matching offered and requested services in the set of four or more service providers may be conducted by a computer via a mathematical algorithm or by the operators of the service exchange platform.

The service exchange system, according to the invention, may include registration, search, advertising, e-commerce, user ranking, user feedback, and user interaction. It may contain a user profile, a database, a password, and other required information. The system contains a search engine to allow looking for specific services in selected times and locations. It may allow users to advertise their service offers in selected zip codes at a selected time. The system may contain scheduling, service category, and service pricing information. It may allow commission-based transactions in the marketplace. The system may also allow service trade between the users. It may allow service providers and receivers to rank each other based on the desired factors. The system may further allow interaction of users electronically.

The receiving information about an offered service and a requested service of each service provider of the set of service providers may be preceded by registration of each service provider. Registration may involve optional or required information. The search capabilities of the marketplace can be extended to desired users' criteria, as a customized search. It may contain scheduling, service category, and service pricing information. The scheduling part can be done on sub-hourly, hourly, daily, weekly, monthly, or annual basis. It can include an extended calendar. The ranking system is used by users of services and can be star or number based, with history, total number, average, comments, judged comments, filtered comments, and chain of comments. It may allow interaction of users electronically.

Users' interactions may be done by email, instant messages, personalized messages, phone, or mail, if the users choose to select these options.

Users may enter the website of the electronic marketplace and may enter the desired postal zip code of the neighborhood in which they are looking for services or interested to offer services at specific intervals of time in daily, weekly, or monthly schedules. The users can look for services offered by other users, buy them, or trade with their own services. They can choose services based on price, proximity, or ranking. Before advertising on the marketplace, users are requested to register. The search capabilities of the marketplace allow users to look for desired services in selected neighborhoods at a desired time and engage in communications and transactions with other users. The service providers and receivers are able to rank each other after trading services. A reminder can be sent to them by e-mail after a certain period following the transaction, or periodically. The revenue and value for the service can be based on the transaction amount in terms of time units, transaction number, with or without thresholds, with or without ranking, advertisements, referral, click numbers, value as a portal, marketing, social networking, trend studies, business focus, peer-to-peer, viral marketing, and cross-marketing.

The platform can have a video or picture commentary or sample of work, or may have a link to a reference for verification and checking the quality of the prior services. The contact can be done by the platform, or directly between the users. It can filter inappropriate comments, text, and images, by human or machine filtering. The platform can filter spam and anything that collects information automatically for a third-party. It can further block the calendars, once an appointment is set, so that a second user will not try to (and cannot) set up a time at exactly the same time.

A service provider can be a volunteer, and the price of their services can be zero. Thus, the exchange between the first service provider and the second service provider can become a unilateral transaction.

The self-serve system may include the following steps: match(es) are displayed to a second service provider so that the second service provider may choose which (if any) of the services offered listed by the system are suitable, and if the second service provider selects a match, the system will facilitate a communication between the first service provider and the second service provider, so they can further explore the match and a service arrangement.

In an embodiment, the service providers may reside within the boundaries of the same zip code. In another embodiment, the service providers may reside within the boundaries of the same state. In still another embodiment, the service providers may reside within the boundaries of the same county. In yet another embodiment, the service providers may reside within the boundaries of the same town.

The computer network for configuring and conducting a service exchange may include:

an input module, wherein each service provider registers;

a plurality of interface modules, wherein each service provider indicates a description of the offered service, a location and a time period within which the offered service can be rendered;

a database, wherein the information about the service providers, time and location of services is stored; and a search module capable of searching the database to find zero, one, or more matches between the offered service of the first service provider and the requested service of the second service provider and zero, one, or more matches between the offered service of the second service provider and the requested service of the first service provider.

The network may further include:
a negotiation module,
a module to generate a means of communication between the network and each of the service providers by using electronic mail, instant messaging, phone, facsimile, regular mail, or a combination thereof; and
an auction module to place a bid on a desired offered service.

In addition, the network may further have a calendar, a dynamic calendar, or a synchronized calendar, which can be compatible with other calendars, such as the calendar in personal digital assistants (PDA) or smart phones. It can also work with a dynamic schedule update feature which tracks changes of available incremental time units offered by the service providers, or imported or exported between different formats and systems.

The services can be exchanged based on electronic certificates, which entitles the owner of the certificate, for example, to 1, 2, or 3 hours of service by another service provider. This can act as a gift certificate, assignment, or transfer of the ownership.

The network may be accessed by providing a username and a password, or by scanning a QR code printed on a marketing card.

In another embodiment, a tangible, non-transient computer readable medium comprising instructions stored thereon to carry out the method for conducting a plurality of electronic service exchanges is provided.

The present inventive concept has been described in terms of exemplary principles and embodiments, but those skilled in the art will recognize that variations may be made and equivalents substituted for what is described without departing from the scope and spirit of the disclosure as defined by the following claims.

What is claimed:

1. A method for conducting a plurality of service exchanges by a network comprising a plurality of interface modules, a database, and a search module,
wherein each exchange is conducted between three or more service providers of a set of service providers,
wherein the set of service providers comprises a first service provider with an offered service ("service X") and a requested service ("service Z") on a first terminal coupled to the network, a second service provider with a different offered service ("service Y") and requested service X on a second terminal coupled to the network, and at least one additional service provider with offered service Z and requested service Y on at least one additional terminal coupled to the network,
wherein each service exchange is conducted on a basis of service description and service time and does not involve any monetary transaction, and
wherein the method comprises:
receiving information about an offered service and a requested service from each service provider of the set of service providers by the plurality of interface modules for storage in the database, wherein the information is provided to initiate one of the plurality of service exchanges;
identifying a plurality of parameters associated with the offered service and the requested service of each service provider in the database by the search module;
identifying an instruction set for each exchange based on the plurality of parameters associated with the offered service and the requested service of each service provider in the database by the search module; and
identifying a match of the offered service X of the first service provider and the requested service X of the second service provider, a match between the offered service Y of the second service provider and the request service Y of the at least one additional service provider, and a match between the offered service Z of the at least one additional service provider and the requested service Z of the first service provider, comprising identifying time increments of the offered service and the requested service of each service provider by the search module; and
wherein the network further provides video or picture hosting, hyperlinking, spam filtering, blocking of data collection, or a combination thereof.

2. The method according to claim 1, wherein the identifying a match between the offered service of the first service provider and the requested service of the at least one additional service provider further comprises:
negotiating the service exchange between the first service provider and the at least additional other service provider when a number of time increments of the offered service of the first service provider does not match a number of time increments of the offered service of the at least one additional service provider.

3. The method according to claim 1, wherein the at least one additional service provider on the at least one additional terminal coupled to be network comprises a third service provider with offered service Z and requested service Y on a third terminal coupled to the network,
wherein the identifying an instruction set for each exchange based on the plurality of parameters associated with the offered service and the requested service of each service provider is followed by:
identifying a match between the offered service X of the first service provider and the requested service X of the second service provider, a match between the offered service Y of the second service provider and the requested service Y of the third service provider, and a match between the offered service Z of the third service provider and the requested service Z of the first service provider; and
conducting the service exchange between the first service provider, the second service provider, and the third service provider.

4. The method according to claim 1, wherein the at least one additional service provider on at least one additional terminal coupled to the network further comprises a third service provider with an offered service ("service W") and requested service Y, and a fourth service provider with offered service Z and requested service W on a fourth terminal coupled to the network,
wherein the identifying an instruction set for each exchange based on the plurality of parameters associated with the offered service and the requested service of each service provider is followed by:
identifying a match between the offered service X of the first service provider and the requested service X of the second service provider, a match between the offered service Y of the second service provider and the requested service Y of the third service provider, a match between the offered service W of the third service provider and the requested service W of the fourth service provider, and a match between the offered service Z of the fourth service provider and the requested service Z of the first service provider; and conducting the service exchange between the first service provider, the second service provider, the third service provider, and the fourth service provider.

5. The method according to claim 1, wherein the receiving information about an offered service and a requested service from each service provider of the set of service providers is preceded by registration of each service provider.

6. The method according to claim 1, wherein the service providers reside within boundaries of the same zip code.

7. The method according to claim 1, wherein the service providers reside within boundaries of the same state.

8. The method according to claim 1, the service provider is an individual or a business entity.

9. The method according to claim 8, wherein the business entity is a corporation.

10. The method according to claim 1, wherein the network comprises:
an input module, wherein each service provider registers;
a plurality of interface modules, wherein each service provider indicates a description of the offered service, a location and a time period within which the offered service can be rendered;
a database, wherein information about the service providers, times and locations of services is stored; and
a search module capable of searching the database to find zero, one, or more matches between the offered service of the first service provider and the requested service of the second service provider and zero, one, or more matches between the offered service of the second service provider and the requested service of the first service provider.

11. The method according to claim 10, wherein the network further comprises a negotiation module.

12. The method according to claim 10, wherein the network further comprises:
a security module;
a billing and payment module to collect a user fee from the service providers upon completion of a successful service exchange; and
a ranking, feedback, and comment module to evaluate quality of the service exchange.

13. The method according to claim 10, wherein the network further comprises:
a module to generate a means of communication between the network and each of the service providers by using electronic mail, instant messaging, phone, facsimile, regular mail, or a combination thereof.

14. The method according to claim 10, wherein the network further comprises:
an auction module to place a bid on a desired offered service.

15. The method according to claim 10, wherein the network further comprises:
a calendar, a dynamic calendar, or a synchronized calendar.

16. The method according to claim 1, wherein access to the network is provided by scanning a QR code printed on a marketing card.

17. A tangible, non-transitory computer readable medium comprising instructions stored thereon to carry out a method for conducting a plurality of service exchanges by a network comprising a plurality of interface modules, a database, and a search module,
wherein each exchange is conducted between three or more service providers of a set of service providers,
wherein the set of service providers comprises a first service provider with an offered service ("service X") and a requested service ("service Z") on a first terminal coupled to the network, a second service provider with a different offered service ("service Y") and requested service X on a second terminal coupled to the network, and at least one additional service provider with offered service Z and requested service Y on at least one additional terminal coupled to the network,
wherein each service exchange is conducted on a basis of service description and service time and does not involve any monetary transaction, and
wherein the method comprises:
receiving information about an offered service and a requested service from each service provider of the set of service providers by the plurality of interface modules for storage in the database, wherein the information is provided to initiate one of the plurality of service exchanges;
identifying a plurality of parameters associated with the offered service and the requested service of each service provider in the database by the search module;
identifying an instruction set for each exchange based on the plurality of parameters associated with the offered service and the requested service of each service provider in the database by the search module; and
identifying a match of the offered service X of the first service provider and the requested service X of the second service provider, a match between the offered service Y of the second service provider and the request service Y of the at least one additional service provider, and a match between the offered service Z of the at least one additional service provider and the requested service Z of the first service provider, comprising identifying time increments of the offered service and the requested service of each service provider by the search module; and
wherein the network further provides video or picture hosting, hyperlinking, spam filtering, blocking of data collection, or a combination thereof.

18. The tangible, non-transient computer readable medium according to claim 17, wherein the identifying a match between the offered service of the first service provider and the requested service of the at least one additional service provider further comprises:
negotiating the service exchange between the first service provider and the at least additional other service provider when a number of time increments of the offered service of the first service provider does not match a number of time increments of the offered service of the at least one additional service provider.

19. The tangible, non-transient computer readable medium according to claim 17, wherein the at least one additional service provider on at least one additional terminal coupled to the network comprises a third service provider with offered service Z and requested service Y on a third terminal coupled to the network, and
wherein the identifying an instruction set for each exchange based on the plurality of parameters associated with the offered service and the requested service of each service provider is followed by:
identifying a match between the offered service X of the first service provider and the requested service X of the second service provider, a match between the offered service Y of the second service provider and the requested service Y of the third service provider, and a match between the offered service Z of the third service provider and the requested service Z of the first service provider; and conducting the service exchange between the first service provider and the second service provider.

* * * * *